(12) United States Patent
Stährfeldt et al.

(10) Patent No.: US 6,174,940 B1
(45) Date of Patent: Jan. 16, 2001

(54) SYNERGISTIC STABILIZER MIXTURE BASED ON POLYALKYL-1-OXA-DIAZASPIRODECANE COMPOUNDS

(75) Inventors: Thomas Stährfeldt, Neusäss; Mathias Mehrer, Gablingen; Matthias Zäh, Gersthofen; Gerhard Pfahler, Augsburg, all of (DE)

(73) Assignee: Clariant GmbH, Frankfurt (DE)

( * ) Notice: Under 35 U.S.C. 154(b), the term of this patent shall be extended for 0 days.

(21) Appl. No.: 09/133,389

(22) Filed: Aug. 13, 1998

(30) Foreign Application Priority Data

Aug. 14, 1997 (DE) ............................................. 197 35 255

(51) Int. Cl.[7] ............................ C08J 3/00; C08K 5/34; C08K 5/35; C08L 77/00; C09K 15/16
(52) U.S. Cl. ............................ 524/99; 524/95; 524/96; 524/97; 524/100; 524/102; 524/103; 524/425; 524/440; 252/401; 252/403; 540/466; 540/543; 540/598; 544/96; 544/209; 544/212; 544/113; 544/219; 546/14; 546/18; 546/19; 546/20
(58) Field of Search .............................. 524/97, 99, 100, 524/95, 96, 102, 103, 425, 440; 544/96, 209, 212, 113, 219; 546/18, 14, 19, 20; 540/466, 543, 598; 252/401, 403

(56) References Cited

U.S. PATENT DOCUMENTS

| | | | |
|---|---|---|---|
| 4,405,735 | 9/1983 | Wiezer et al. ................ | 524/95 |
| 4,408,051 | 10/1983 | Hinsken et al. . | |
| 4,692,486 | 9/1987 | Gugumus ..................... | 524/100 |
| 4,797,436 | 1/1989 | Ertl et al. . | |
| 4,863,981 | 9/1989 | Gugumus ..................... | 524/97 |
| 4,957,953 | 9/1990 | Kikkawa et al. ............. | 524/99 |
| 5,169,925 | 12/1992 | Schmailzl et al. . | |
| 5,550,234 | 8/1996 | Gaa et al. ...................... | 540/466 |
| 5,633,378 | 5/1997 | Gaa et al. ...................... | 546/16 |
| 5,719,217 | 2/1998 | Gugumus . | |

FOREIGN PATENT DOCUMENTS

| | | |
|---|---|---|
| 196 18 982 | 10/1996 | (DE) . |
| 198 20 157 | 11/1998 | (DE) . |
| 0057885 | 8/1982 | (EP) . |
| 0080431 | 6/1983 | (EP) . |
| 0449685 | 10/1991 | (EP) . |
| 0632092 | 1/1995 | (EP) . |
| 0676405 | 10/1995 | (EP) . |
| 0690060 | 1/1996 | (EP) . |
| 0705836 | 4/1996 | (EP) . |
| 0709426 | 5/1996 | (EP) . |
| 2267499 | 12/1993 | (GB) . |
| 2301106 | 11/1996 | (GB) . |
| WO 92/12201 | 7/1992 | (WO) . |
| WO 94/22946 | 10/1994 | (WO) . |

OTHER PUBLICATIONS

UK Patent Search Report.
Derwent Patent Family Report and/or Abstract.

Primary Examiner—Patrick D. Niland
(74) Attorney, Agent, or Firm—Susan S. Jackson; Scott E. Hanf

(57) ABSTRACT

The present invention relates to mixtures comprising the compound I in a proportion of 65–95% by weight, the compound II in a proportion of 5–35% by weight and the compound III in a proportion of 0–10% by weight

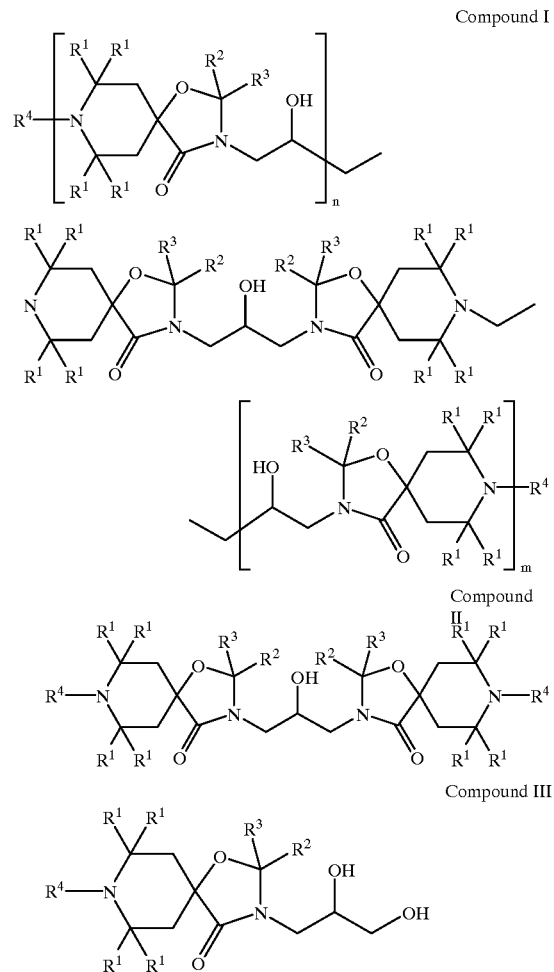

wherein the substituents are as defined in the description, and to mixtures with other compounds. The mixtures are suitable for stabilizing organic material against the effect of light and heat.

14 Claims, No Drawings

SYNERGISTIC STABILIZER MIXTURE BASED ON POLYALKYL-1-OXA-DIAZASPIRODECANE COMPOUNDS

BACKGROUND OF THE INVENTION

It is known that organic materials are damaged by light, radiation, heat or oxygen. There are already numerous documents which describe compounds for stabilizing organic material against the effects of light and heat. Some of these documents relate to compounds based on 2,2,6,6-tetraalkylpiperidine. These stabilizers must be present in sufficient concentration especially at the exposed areas of the organic material in order to provide effective protection. The low molecular mass representatives from the class of substance of the 2,2,6,6-tetraalkylpiperidines have the advantage of migrating rapidly to the areas particularly exposed to the damaging influences, where they exert their protective influence. Nevertheless, they have the disadvantage that they possess excessive volatility and, in addition, are readily extractable from the organic material. The higher molecular mass representatives of this class of substance, although not so readily extractable, are much slower to migrate. In the art this problem is often solved by employing a mixture of low molecular mass (rapidly migrating) and high molecular mass (slowly migrating) stabilizers.

A considerable number of stabilizer mixtures based on sterically hindered amines have been presented which possess the abovementioned disadvantages to a lesser degree if at all. By way of example there may be mentioned mixtures as described, for example, in U.S. Pat. No. 4,692,486, U.S. Pat. No. 4,863,981, U.S. Pat. No. 4,957,953, WO-A-92/12201, WO-A-94/22946, EP-A449685, EP-A-623 092, GB-A-2 267 499, DE-A-1 9613 982 and in Research Disclosure No. 34549 (Jan. 1993). However, there is a constant demand for new, more effective stabilizer mixtures which give organic material improved photoprotective or service properties.

It has surprisingly now been found that the compound I in a mixture with the compound II and, if desired, with the compound III stabilizes organic material extremely well against the damaging effects of light, radiation, heat or oxygen.

SUMMARY OF THE INVENTION

The invention hence provides mixtures comprising the compound I in a proportion of 65–95, preferably from 75 to 94 and, in particular, from 85 to 94% by weight, the compound II in a proportion of from 5 to 35, preferably from 5 to 20 and, in particular, from 5 to 12% by weight and the compound III in a proportion of from 0 to 10, preferably from 1 to 5 and, in particular, from 1 to 3% by weight.

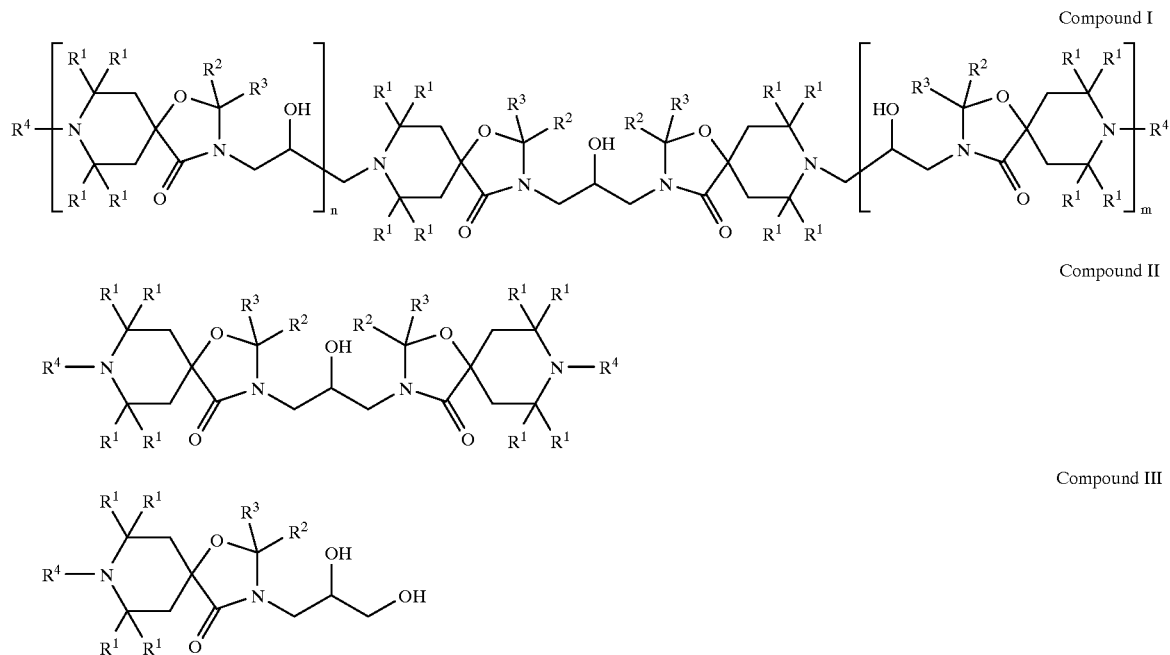

Compound I

Compound II

Compound III in which
n and m independently of one another are a number from 0 to 100, but n and m cannot both be 0,
$R^1$ is hydrogen, $C_5$–$C_7$-cycloalkyl, or a $C_1$–$C_{12}$-alkyl group,
$R^2$ and $R^3$ independently of one another are a hydrogen atom or a $C_1$–$C_{18}$-alkyl group or, together with the carbon atom connecting them, are a 5- to 1 3-membered ring or, together with the carbon atom connecting them, are a group of the formula (IV)

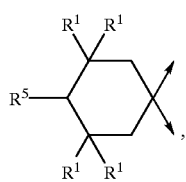

(IV)

$R^4$ and $R^5$ independently of one another are either hydrogen or a $C_1$–$C_{22}$-alkyl group, an oxygen radical O*, —OH, —NO, —CH$_2$CN, benzyl, allyl, a C$_1$–C$_{30}$-alkyloxy group, a C$_5$–C$_{12}$-cycloalkyloxy group, a C$_6$–C$_{10}$-aryloxy group in which additionally the aryl radical may also be substituted, a C$_7$–C$_{20}$-arylalkyloxy group in which additionally the aryl radical may also be substituted, a C$_3$–C$_{10}$-alkenyl group, a C$_3$–C$_6$-alkynyl group, a C$_1$–C$_{10}$-acyl group, halogen or unsubstituted or C$_1$–C$_4$-alkyl-substituted phenyl.

In order to avoid any confusion this mixture of the invention is referred to below as mixture M.

Also highly suitable are mixtures in which n and m independently of one another are a number from 0 to 10, but n and m cannot both be 0, R$^1$ is hydrogen, C$_6$-cycloalkyl, or a C$_1$–C$_4$-alkyl group, R$^2$ and R$^3$ independently of one another are a hydrogen atom or a C$_1$–C$_6$-alkyl group or, together with the carbon atom connecting them, are a 6- to 12-membered ring or, together with the carbon atom connecting them, are a group with formula (IV), R$^4$ and R$^5$ independently of one another are either hydrogen or a C$_1$–C$_5$-alkyl group, an oxygen radical O*, —OH, —NO, —CH$_2$CN, benzyl, allyl, a C$_1$–C$_{10}$-alkyloxy group, a C$_5$–C$_6$-cycloalkyloxy group, a C$_6$–C$_7$-aryloxy group in which additionally the aryl radical can also be substituted, a C$_7$–C$_{10}$-arylalkyloxy group in which additionally the aryl radical can also be substituted, a C$_3$–C$_6$-alkenyl group, a C$_3$–C$_6$-alkynyl group, a C$_1$–C$_4$-acyl group, halogen or unsubstituted or C$_1$–C$_2$-alkyl-substituted phenyl.

DESCRIPTION OF THE PREFERRED EMBODIMENTS

Particularly preferred mixtures are those in which n and m independently of one another are a number from 0 to 5, but n and m cannot both be 0, R$^1$ is methyl, R$^2$ and R$^3$, together with the carbon atom connecting them, are a 12-membered ring or, together with the carbon atom connecting them, are a group of the formula (IV), R$^4$ and R$^5$ independently of one another are hydrogen, methyl, acetyl, octyloxy or cyclohexyloxy.

Likewise highly suitable are mixtures in which the substituents R$^1$ to R$^4$ in compound I to III have the same definition.

The preparation of compounds of the formula I where R$^4$ is hydrogen has already been described in German Patent Application No.197 19 944.5. The preparation of the compounds II is described sufficiently in EP-A-0 705 836 and EP-A-0 690 060. The preparation of the compound II where R$^4$ is H is sufficiently described in EP-A-57 885, Example 20. The preparation of the compound III where R$^4$ is H is sufficiently described in EP-A-57 885, Example 7.

The mixture M can be prepared simply by combining the compounds I, II and, if desired, III in the desired proportion. This procedure can take place, for example, in a powder mixer, in which the substances are mixed in dry form. Additionally or alternatively, the powder mixture can also be homogenized by melting under an inert gas. The mixing operation can also be performed with the aid of a solvent, which is removed from the mixture again by evaporation after the pulverulent components have been thoroughly mixed.

The mixture M of the invention is outstandingly suitable for stabilizing organic material against the action of light, oxygen and heat. It can be added to the organic material to be stabilized prior to, during or after polymerization, in solid form, as a melt, as a solution in solvents or else as a materbatch. The solutions may comprise the mixture M, for example, in 5–80% concentration; a materbatch is particularly appropriate if it comprises the mixture M in a concentration of from 1 to 80%, but preferably 5–30%, with the remainder of the masterbatch comprising a polymer compatible with the polymer to be stabilized. Both the solution and the masterbatch may additionally include other stabilizers or effect substances, examples being UV absorbers, antioxidants, pigments, acid scavengers or fillers. The mixture M is preferably employed such that its concentration in the polymer to be stabilized is from 0.001 to 5% by weight, preferably from 0.02 to 2% by weight, based on the organic material, and it is present either alone or in combination with further additives. The term organic material embraces, for example, precursors for plastics, coating materials, lacquers and oils, but especially the plastics, coating materials, lacquers and oils themselves.

The mixture M is particularly suitable for stabilizing films, fibers, tapes, multifilaments, fabrics, extruded, blow-molded, injection-molded and thermoformed articles, powder coating materials, printing inks, toner inks, photographic material, pigments, wood stains, leathers, architectural paints, protective coatings for steel structures, lubricating oils, machine oils, bitumen or asphalt and for stabilizing compounds which have a tendency to undergo spontaneous polymerization. The mixture M of the invention can also be employed, advantageously, in combinations with further stabilizers. The result of these novel combinations are mixtures having an improved profile of properties with respect to the individual components, such as synergy in the photoprotective effect, for example. Combining the mixture M with monomeric HALS stabilizers in a weight ratio of from 10:1 to 1:10 is particularly advantageous. Combinations of polymeric with monomeric HALS stabilizers are described, for example, in EP-A-80 431 and EP-A-632 092. It is particularly advantageous to combine, in accordance with the invention, the mixture M with compounds of the formulae A1 to A10.

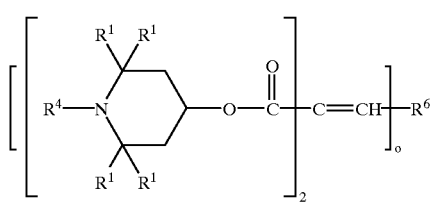

A1 in which

R$^1$ and R$^4$ are as defined above,

R$^6$ is an aromatic radical substituted one or more times by hydrogen, C$_1$–C$_4$-alkyl, C$_1$–C$_4$-alkoxy, halogen, cyano, carboxyl, nitro, amino, C$_1$–C$_4$-alkylamino, C$_1$–C$_4$-dialkylamino, or acyl, o is 1 or 2,

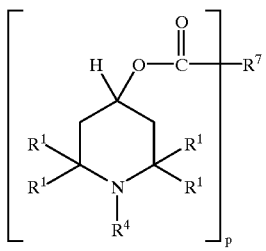

in which
R¹ and R⁴ are as defined for formula I to III,
p=1 or 2 and,
if p=1,
R⁷ is $C_1$–$C_{22}$-alkyl, $C_2$–$C_{18}$-oxaalkyl, $C_2$–$C_{18}$-thiaalkyl, $C_2$–$C_{18}$-azaalkyl or $C_2$–$C_8$-alkenyl;
if p=2,
R⁷ is $C_1$–$C_{22}$-alkylene, $C_2$–$C_{18}$-oxaalkylene, $C_2$–$C_{18}$-thiaalkylene, $C_2$–$C_{18}$-azaalkylene or $C_2$–$C_8$-alkenylene,

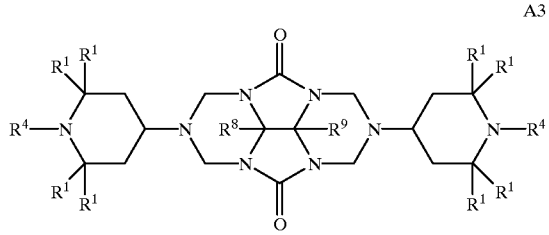

in which
R¹ and R⁴ are as defined in formula I to III,
R⁸ and R⁹ independently of one another are hydrogen, $C_1$–$C_6$-alkyl, $C_7$–$C_{12}$-aralkyl, -aryl or carboxylic ester,
R⁸ and R⁹ together are a tetra- or pentamethyl group;

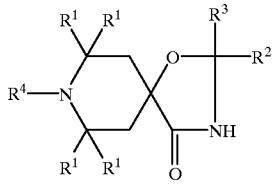

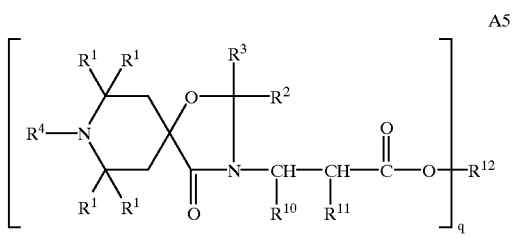

in which
R¹, R², R³ and R⁴ are as defined for formula I to III,
q is 1 or 2,
R¹⁰ is hydrogen, methyl, phenyl or carb-$C_1$–$C_{21}$-alkoxy,
R¹¹ is hydrogen or methyl, R¹² if q=1, is hydrogen, $C_1$–$C_{21}$-alkyl, $C_2$–$C_{22}$-alkenyl, $C_5$–$C_{12}$-cycloalkyl, a radical of the formula

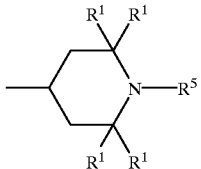

where

R¹ and R⁵ are as defined for formula I to III, and
R¹² if q=2, is $C_1$–$C_{18}$-alkylene, $C_5$–$C_9$-cycloalkylene or arylene;

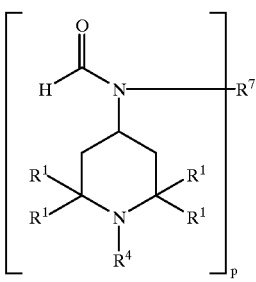

where R¹, R⁴, R⁷ and p are as defined above;

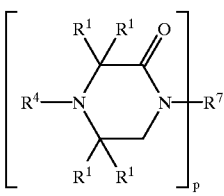

where R¹, R⁴, R⁷ and p are as defined above;

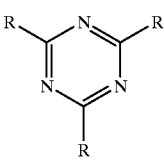

where R¹, R⁴ are as defined above,

R³⁰ is hydrogen, $C_1$–$C_{12}$-alkyl, $C_5$–$C_{12}$-cycloalkyl, phenyl or $C_7$–$C_9$-phenylalkyl, and a is a number from 1 to 10;

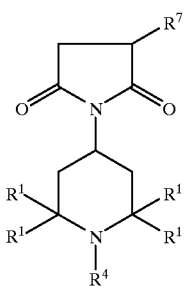

A9 where $R^1$ and $R^4$ are as defined above and $R^7$ is as defined for the formula A2 where p=1;

a product A10 obtainable by reacting a polyamine of the formula A10a with formula A10b:

(A10a)

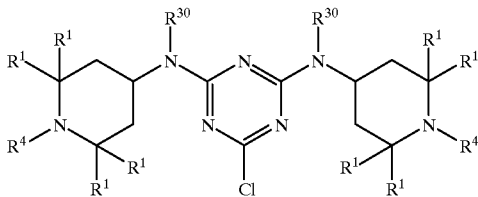

(A10b)

where $R^1$, $R^4$ and $R^{30}$ are as defined above, $n_{5'}$, $n_{5''}$, and $n_{5'''}$, independently of one another are a number from 2 to 12.

Preference is given to mixtures of the mixture M with compounds of the formulae A1 to A10 in which n and m independently of one another are a number from 0 to 10, but n and m cannot both be 0, $R^1$ is hydrogen or a $C_1$–$C_4$-alkyl group, $R^2$ and $R^3$ independently of one another are a hydrogen atom, a $C_1$–$C_8$-alkyl group or, together with the carbon atom connecting them, are a 6- to 12-membered ring or, together with the carbon atom connecting them, are a group of the formula (IV), $R^4$ and $R^5$ independently of one another are either hydrogen or a $C_1$–$C_5$-alkyl group, an oxygen radical O*, —OH, —NO, —CH$_2$CN, benzyl, allyl, a $C_1$–$C_{10}$-alkyloxy group, a $C_5$–$C_6$-cycloalkyloxy group, a $C_6$–$C_7$-aryloxy group in which additionally the aryl radical may also be substituted; a $C_7$–$C_{10}$-arylalkyloxy group in which additionally the aryl radical may also be substituted; a $C_3$–$C_6$-alkenyl group, a $C_3$–$C_6$-alkynyl group, a $C_1$–$C_4$-acyl group, halogen, or unsubstituted or $C_1$–$C_2$-alkyl-substituted phenyl, $R^7$ is a straight-chain $C_1$–$C_{10}$-alkylene (if p=2); $C_1$–$C_{12}$-alkyl (if p=1)

$R^8$ and $R^9$ independently of one another are hydrogen, $C_1$–$C_2$-alkyl, $C_7$–$C_8$-arylalkyl, aryl- or carboxylic ester, $R^{10}$ is hydrogen, methyl, phenyl or $C_1$–$C_2$-alkoxy, $R^{11}$ is hydrogen or methyl, $R^{12}$, if q=1, is hydrogen, $C_1$–$C_{16}$-alkyl, $C_2$–$C_{16}$-alkenyl, $C_5$–$C_6$-cycloalkyl, a radical of the formula

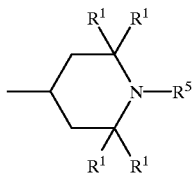

$R^{12}$, if q=2, is $C_1$–$C_{16}$-alkylene, $C_5$–$C_6$-cycloalkylene or arylene, $R^{30}$ is hydrogen, $C_1$–$C_8$-alkyl, $C_5$–$C_7$-cycloalkyl, phenyl or $C_7$–$C_8$-phenylalkyl, a is 1 to 5, o is 1 and p is 2 to 5.

Very particular preference is given to mixtures of the mixture M and compounds of the formulae A1 to A10 in which n and m independently of one another are a number 0–5, but n and m cannot both be 0, $R^1$ is methyl, $R^2$ and $R^3$, together with the carbon atom connecting them, are a 12-membered ring or, together with the carbon atom connecting them, are a group of the formula (IV), $R^4$ and $R^5$ independently of one another are hydrogen, methyl, acetyl, octyloxy or cyclohexyloxy, $R^6$ is p-methoxyphenyl, $R^7$ is octamethylene, hexamethylene or ethylene (if p=2), dodecyl (if p=1), $R^8$ and $R^9$ are hydrogen, $R^{10}$ is hydrogen, $R^{11}$ is hydrogen, $R^{12}$ is dodecamethylene or tetradecamethylene, $R^{30}$ is cyclohexyl or n-butyl, a is 2, o is 1, p is 2 and q is 1.

The following compounds are especially suitable in a mixture with the mixture M:

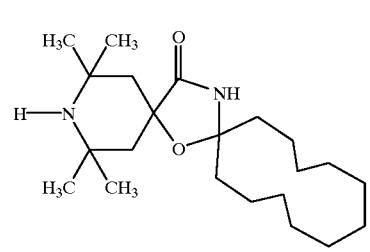

A'1

A'2 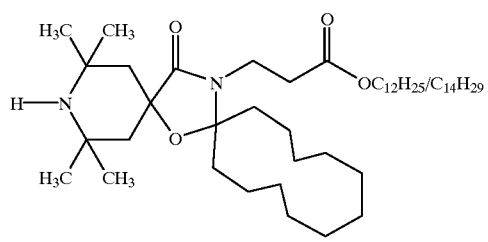
A'3 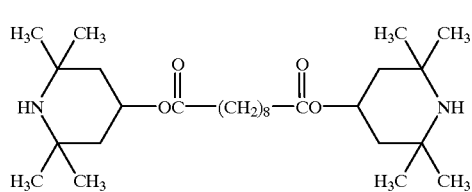
A'4 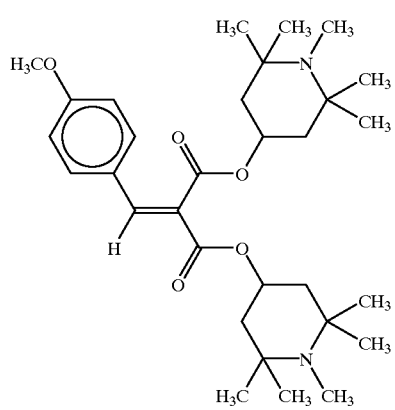
A'5 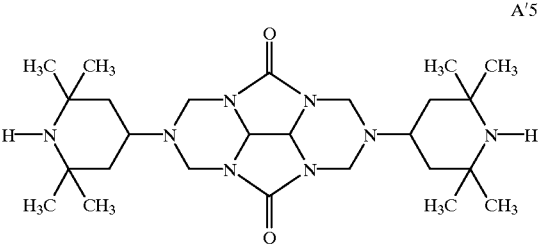
A'6 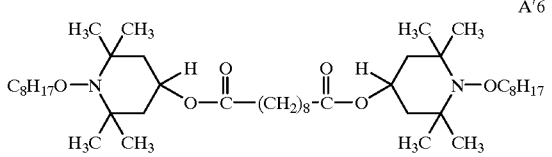
A'7 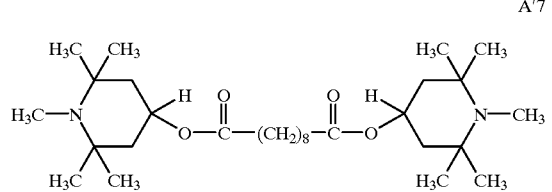
A'8 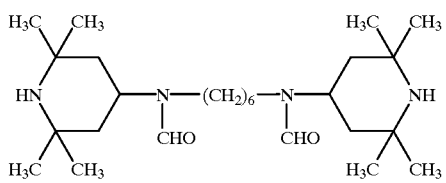
A'9 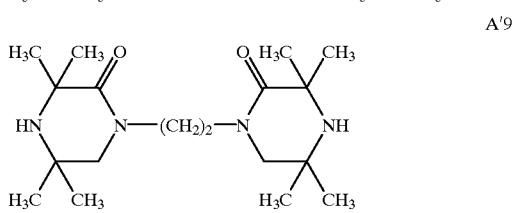
A'10 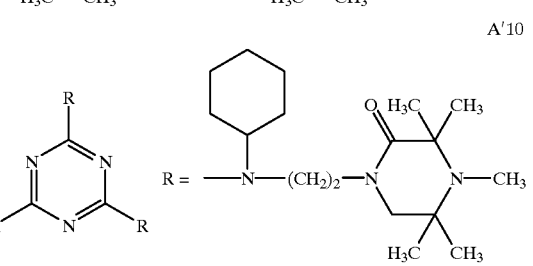
A'11 
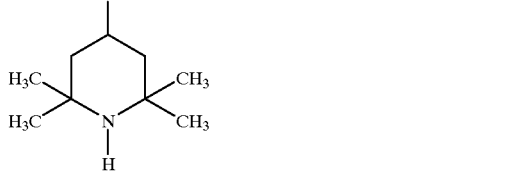
A'12 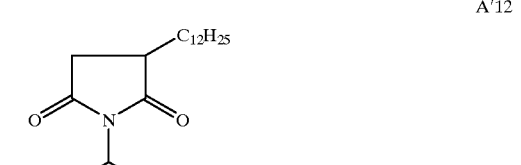
A'13 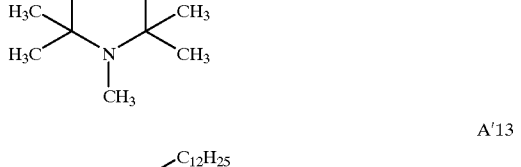
A'14 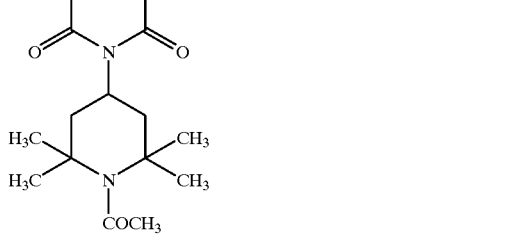
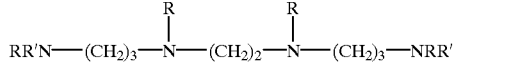

-continued where R =
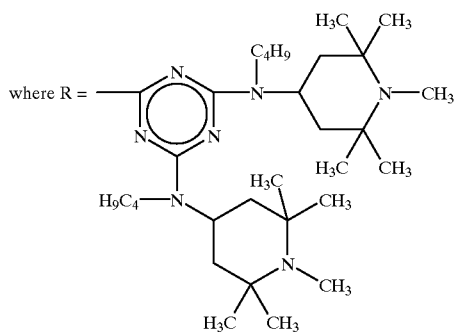
and R' = H, CH₃

A particularly suitable embodiment of the invention comprises mixtures of the mixture M with one or more stabilizers based on sterically hindered amines, where the stabilizer(s) is (are) ®Tinuvin 770, ®Tinuvin 765, ®Tinuvin 123, ®Hostavin N 20, ®Hostavin N 24, ®Uvinul 4049, ®Sanduvor PR 31, ®Uvinul 4050, ®Good-rite UV 3034 or ®Good-rite 3150, ®Sanduvor 3055, ®Sanduvor 3056, ®Sanduvor 3058, ®Chimassorb 119 and ®Chimassorb 905.

The mixture M of the invention can also be employed advantageously with polymeric HALS stabilizers in a weight ratio of from 10:1 to 1:10. The result of these new combinations are mixtures which have an improved profile of properties with respect to the individual components; for example, synergy in the photoprotective effect. Combinations of polymeric HALS stabilizers are described, for example, in EP-A-252 877, EP-A-709 426, Research Disclosure Jan. 1993 No. 34549, EP-A-723 990.

A particularly preferred embodiment comprises the combinations of the mixture M with polymeric HALS compounds of the formulae B1 to B7:

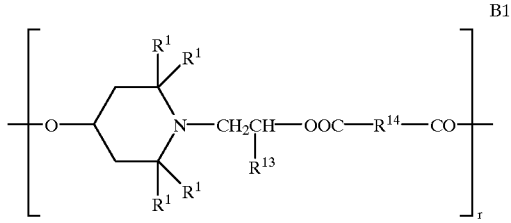
B1 in which
$R^1$ is hydrogen, $C_5$–$C_7$-cycloalkyl or a $C_1$–$C_{12}$-alkyl group, $R^{13}$ is hydrogen or methyl,
$R^{14}$ is a direct bond or $C_1$–$C_{10}$-alkylene and
r is a number from 2 to 50;

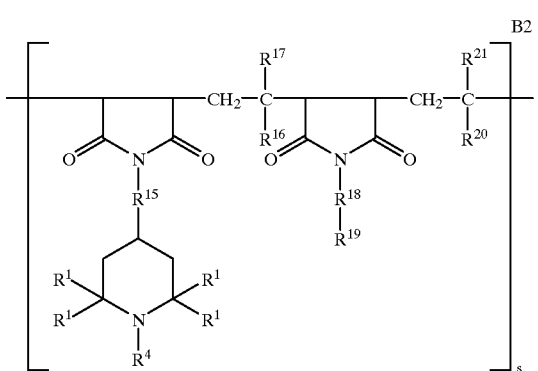
B2 where $R^1$ and $R^4$ are as defined for formula I to III, $R^{15}$ and $R^{18}$ independently of one another are a direct bond or a group —N($R^{22}$)—CO—$R^{23}$—CO—N($R^{24}$)—, $R^{22}$ and $R^{24}$ independently of one another are hydrogen, $C_1$–$C_8$-alkyl, $C_5$–$C_{12}$-cycloalkyl, phenyl, $C_7$–$C_9$-phenylalkyl or a group of the formula

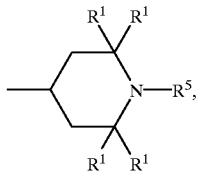
B2a $R^{23}$ is a direct bond or $C_1$–$C_4$-alkylene, $R^{16}$, $R^{17}$, $R^{20}$ and $R^{21}$ independently of one another are hydrogen, $C_1$–$C_{30}$-alkyl, $C_5$–$C_{12}$-cycloalkyl, phenyl or a group of the formula B2a, $R^{19}$ is hydrogen, $C_1$–$C_{30}$-alkyl, $C_5$–$C_{12}$-cycloalkyl, $C_7$–$C_9$-phenylalkyl, phenyl or a group of the formula B2a and s is a number from 1 to 50;

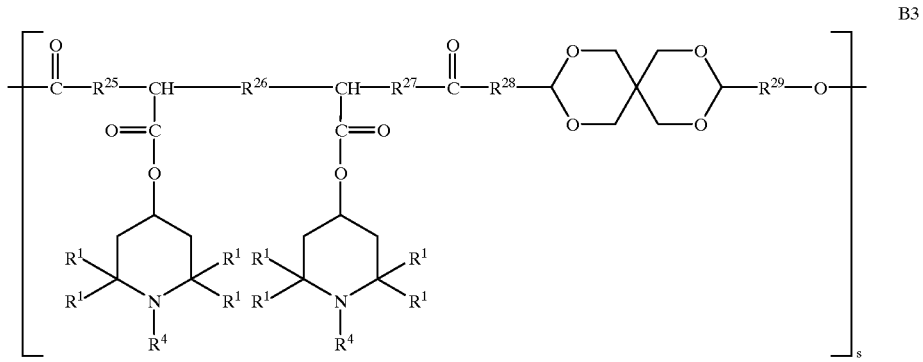

where

R¹, R⁴ and s are as defined above,

R²⁵, R²⁶, R²⁷, R²⁸ and R²⁹ independently of one another are a direct bond or $C_1$–$C_{10}$-alkylene;

a product B4 obtainable by reacting a polyamine of the formula B4a with cyanuric chloride and then reacting the resulting product with a compound of the formula B4b,

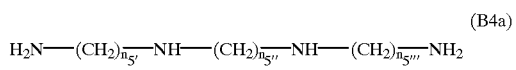

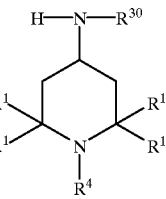

where
R¹ and R⁴ are as defined for formula I to III,
$n_{5'}$, $n_{5''}$, and $n_{5'''}$, independently of one another are a number from 2 to 12,
R³⁰ is as defined above; where B4 is a compound of the formula B4-1, B4-2, B4-3

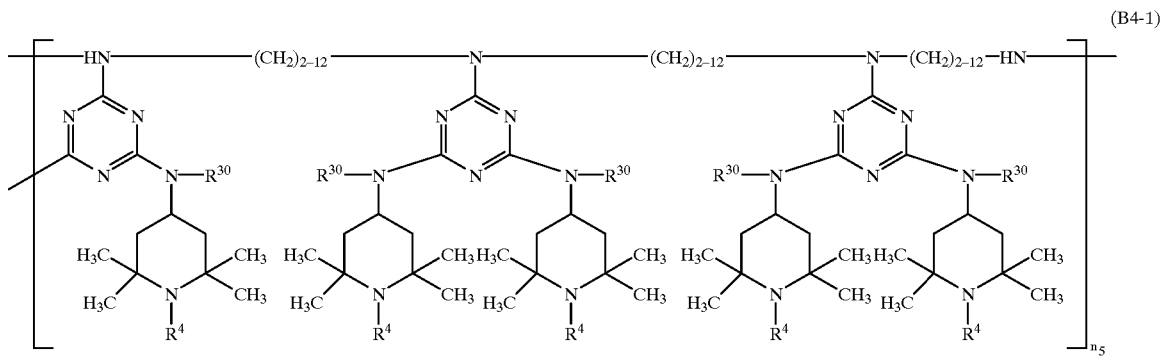

(B4-2)

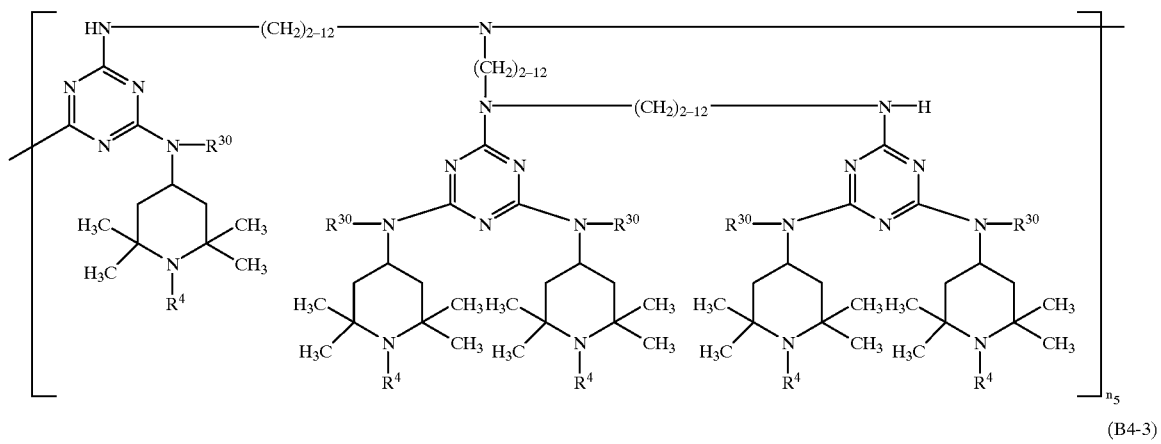

(B4-3)

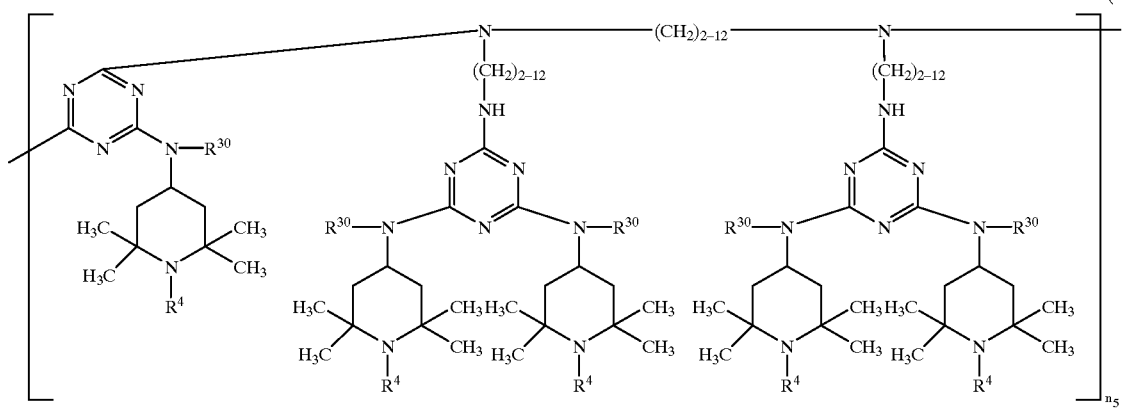

or a mixture thereof, in which
$n_5$ is 1 to 20,
$R^4$ and $R^{30}$ are as defined above;

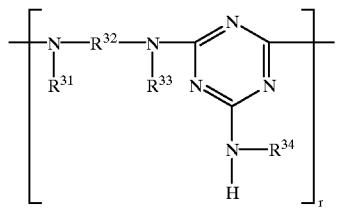

where
r is as defined for formula B1,
$R^{31}$, $R^{33}$ and $R^{34}$ independently of one another are hydrogen, $C_1$–$C_{12}$-alkyl, $C_5$–$C_{12}$-cycloalkyl, $C_1$–$C_4$-alkyl-substituted $C_5$–$C_{12}$-cycloalkyl, phenyl, —OH— and/or $C_1$–$C_{10}$-alkyl-substituted phenyl, $C_7$–$C_9$-phenylalkyl, $C_7$–$C_9$-phenylalkyl substituted on the phenyl radical by —OH and/or $C_1$–$C_{10}$-alkyl, or a group of the formula B5a

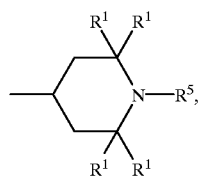

where
$R^1$ and $R^5$ are as defined above, and
$R^{32}$ is $C_2$–$C_{18}$-alkylene, $C_5$–$C_7$-cycloalkylene or $C_1$–$C_4$-alkylenedi($C_5$–$C_7$-cycloalkylene), or the radicals $R^{31}$, $R^{32}$ and $R^{33}$, together with the nitrogen atoms to which they are attached, form a 5- to 10-membered heterocyclic ring, and where at least one of the radicals $R^{31}$, $R^{33}$ and $R^{34}$ is a group of the formula B5a;

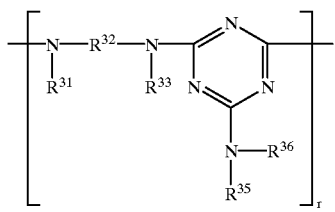

B6 in which

R$^{31}$, R$^{32}$, R$^{33}$ and r are as defined above,

R$^{35}$ and R$^{36}$ independently of one another can have the definition of R$^{34}$, or R$^{35}$ and R$^{36}$ together with the nitrogen atom to which they are attached, form a 5- to 10-membered heterocyclic ring which may in addition to the nitrogen heteroatom contain one or more heteroatoms, preferably an oxygen atom, and at least one of the radicals R$^{31}$, R$^{33}$, R$^{35}$ and/or R$^{36}$ is a group of the formula (B5a);

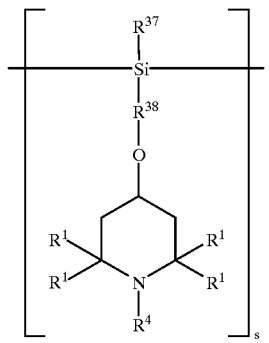

B7 where

R$^1$ and R$^4$ are as defined for formula I to III, s is as defined for formula B3, R$^{37}$ is C$_1$–C$_{10}$-alkyl, C$_5$–C$_{12}$-cycloalkyl, C$_1$–C$_4$-alkyl-substituted C$_5$–C$_{12}$-cycloalkyl, phenyl or C$_1$–C$_{10}$-alkyl-substituted phenyl, and R$^{38}$ is C$_3$–C$_{10}$-alkylene.

The compounds described as components B1 to B7 are essentially known (in some cases obtainable commercially) and can be prepared by known methods as described, for example, in U.S. Pat. No. 4,233,412, U.S. Pat. No. 4,340,534, U.S. Pat. No. 4,857,595, DD-A-262 439 (Derwent 89-122 983/17, Chemical Abstracts 111:58 964u), DE-AA 239 437 (Derwent 94-177 274122), U.S. Pat. No. 4,529,760, U.S. Pat. No. 4,477,615 and Chemical Abstracts - CAS No. 136 504-96-6.

Component B4 can be prepared in analogy to known methods: for example, by reacting a polyamine of the formula B4a with cyanuric chloride in a molar ratio of from 1:2 to 1:4 in the presence of anhydrous lithium, sodium or potassium carbonate in an organic solvent such as 1,2-dichloroethane, toluene, xylene, benzene, dioxane or tert-amyl alcohol at a temperature of from −20° C. to +10° C., preerably from −10° C. to +10° C. and, in particular, from 0° C. to +10° C. for from 2 to 8 hours and then reacting the resulting product with a 2,2,6,6-tetramethyl-4-piperidylamine of the formula B4b. The molar ratio of 2,2,6,6-tetramethyl-4-piperidylamine to polyamine in the formula B4a employed is, for example, from 4:1 to 8:1. The amount of 2,2,6,6-tetramethyl-4-piperidylamine can be added all at once or in two or more portions with an interval of several hours.

The ratio of polyamine in the formula B4a to cyanuric chloride to 2,2,6,6-tetramethyl-4-piperidylamine of the formula B4b is preferably from 1:3:5 to 1:3:6.

The following example indicates one possibility for the preparation of the preferred component B4.

Example: 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted in 250 ml of 1,2-dichloroethane at 5° C. with stirring for 3 hours. The mixture is heated at room temperature for a further 4 hours. 27.2 g (0.128 mol) of N-(2,2,6,6-tetramethyl-4-piperidyl)butylamine are added and the resulting mixture is heated at 60° C. for 2 hours. A further 18 g (0.13 mol) of anhydrous potassium carbonate are added, and the mixture is heated at 60° C. for a further 6 hours. The solvent is distilled off under a gentle vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is heated at reflux for 2 hours, and the water formed in the course of the reaction is removed by azeotropic distillation for a further 12 hours. The mixture is filtered. The solution is washed with water and dried over Na$_2$SO$_4$. The solvent is evaporated and the residue is dried at 120–130° C. under vacuum (0.1 mbar), giving component B4 as a colorless resin.

In general, component B4 can be represented, for example, by a compound of the formula B4-1, B4-2 or B4-3. It can also be present as a mixture of these three compounds.

A preferred meaning of the formula B4-1 is

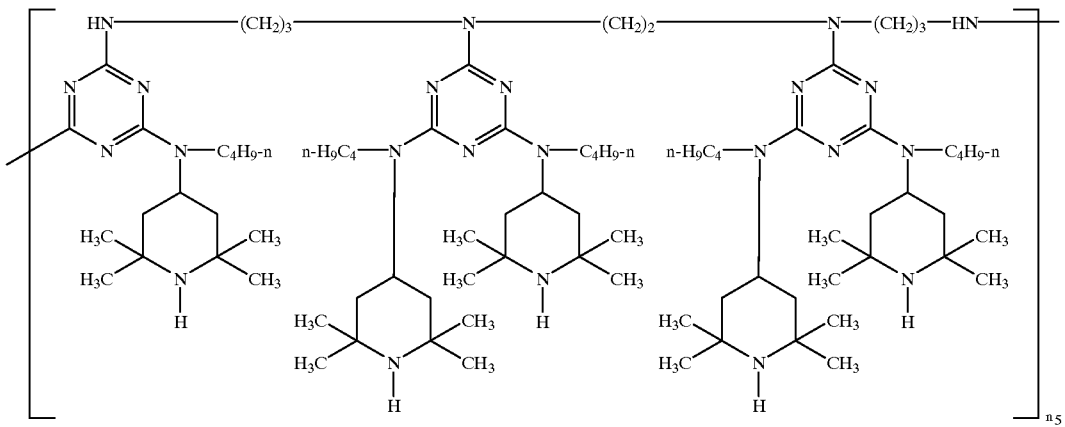
A preferred meaning of the formula B4-2 is
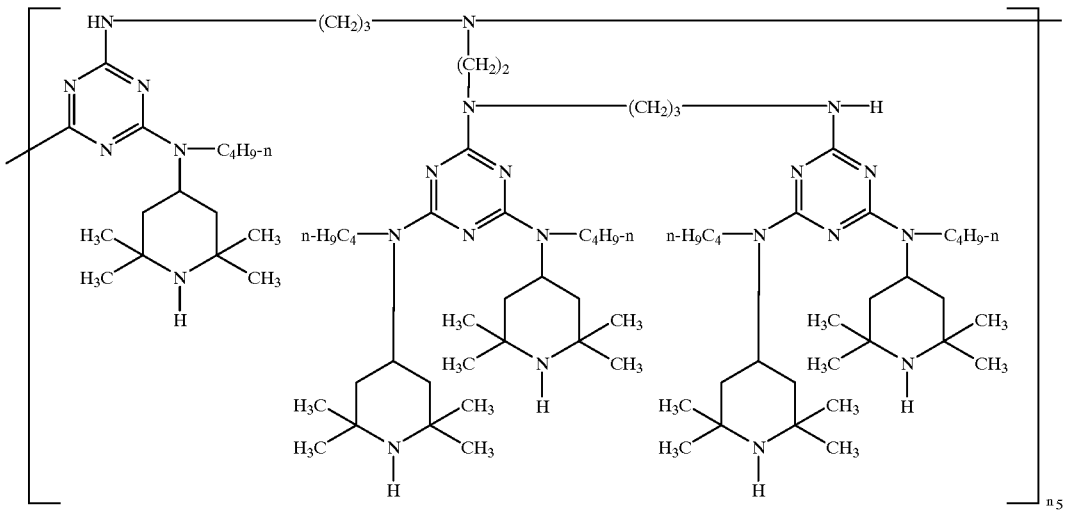
A preferred meaning of the formula B4-3 is Preference is given to mixtures of the mixture M with compounds of the formulae B1 to B7 in which n and m independently of one another are a number from 0 to 10, but n and m cannot both be 0, $R^1$ is hydrogen or a $C_1$–$C_4$-alkyl group, $R^2$ and $R^3$ independently of one another are a hydrogen atom or a $C_1$–$C_8$-alkyl group or, together with the carbon atom connecting them, are a 6- to 12-membered ring or, together with the carbon atom connecting them, are a group with the formula (IV), $R^4$ and $R^5$ independently of one another are either hydrogen or a $C_1$–$C_5$-alkyl group, an oxygen radical O*, —OH, —NO, —CH$_2$CN, benzyl, allyl, a $C_1$–$C_{10}$-alkyloxy group, a $C_5$–$C_6$-cycloalkyloxy group, a $C_6$–$C_7$-aryloxy group in which additionally the aryl radical may also be substituted, a $C_7$–$C_{10}$-arylalkyloxy group in which additionally the aryl radical may also be substituted, a $C_3$–$C_6$-alkenyl group, a $C_3$–$C_6$-alkynyl group, a $C_1$–$C_4$-acyl group, halogen or unsubstituted or $C_1$–$C_2$-alkyl-substituted phenyl, $R^{13}$ is hydrogen or methyl, $R^{14}$ is $C_1$–$C_5$-alkylene, $R^{17}$, $R^{21}$ are hydrogen or $C_1$–$C_4$-alkyl, $R^{15}$, $R^{18}$ are a direct bond, $R^{16}$, $R^{20}$ are $C_1$–$C_{25}$-alkyl, phenyl, $R^{19}$ is hydrogen, $C_1$–$C_{12}$-alkyl or a group with the formula B2a, $R^{25}$, $R^{26}$, $R^{27}$, $R^{28}$ and $R^{29}$ independently of one another are a direct bond or $C_1$–$C_5$-alkylene, $R^{30}$ is hydrogen, $C_1$–$C_4$-alkyl, $C_5$–$C_6$-cycloalkyl or phenyl, $R^{31}$, $R^{33}$ and $R^{34}$ independently of one another are hydrogen, $C_1$–$C_{10}$-alkyl, $C_5$–$C_6$-cycloalkyl or a group with the formula B5a, $R^{32}$ is $C_2$–$C_{10}$-alkylene or $C_5$–$C_6$-cycloalkylene, $R^{35}$ and $R^{36}$ independently of one another are as defined for $R^{34}$, or $R^{35}$ and $R^{36}$, together with the nitrogen atom to which they are attached, form a 5- to 7-membered heterocyclic ring which may also contain one or more heteroatoms, preferably an oxygen atom, and at least one of the radicals $R^{31}$, $R^{33}$ $R^{35}$ and/or $R^{36}$ is a group of the formula B5a, $R^{37}$ is $C_1$–$C_5$-alkyl, $C_5$–$C_6$-cycloalkyl or phenyl, $R^{38}$ is $C_3$–$C_5$-alkylene and $n_{5'}$, $n_{5''}$, $n_{5'''}$ are 2 to 4.

Very particularly preferred mixtures of the mixture M of compounds of the formula B1 to B7 are those in which n and m independently of one another are a number from 0 to 5, but n and m cannot both be 0, $R^1$ is methyl, $R^2$ and $R^3$, together with the carbon atom connecting them, are a 12-membered ring or, together with the carbon atom connecting them, are a group of the formula (IV), $R^4$ and $R^5$ independently of one another are hydrogen, acetyl, methyl, octyloxy or cyclohexyloxy, $R^{13}$ is hydrogen, $R^{14}$ is ethylene, $R^{17}$, $R^{21}$ are hydrogen or methyl, $R^{15}$, $R^{18}$ are a direct bond, $R^{16}$, $R^{20}$ are $C_1$–$C_{25}$-alkyl, phenyl, $R^{19}$ is hexadecyl or a group of the formula B2a, $R^{25}$ $R^{27}$ are methylene, $R^{26}$ is a direct bond, $R^{28}$ is 2,2-dimethylethylene, $R^{29}$ is 1,1-dimethylethylene, $R^{30}$ is n-butyl, $R^{31}$, $R^{33}$ and $R^{34}$ independently of one another are isooctyl, cyclohexyl or 2,2,6,6-tetramethylpiperid-4-yl, and at least one of the radicals $R^{31}$, $R^{33}$ and $R^{34}$ must in this case be 2,2,6,6-tetramethylpiperid-4-yl, $R^{32}$ is hexamethylene, $R^{35}$ and $R^{36}$ independently of one another are as defined for $R^{34}$, or $R^{35}$ and $R^{36}$, together with the nitrogen atom to which they are attached, form a 6-membered heterocyclic ring which also contains an oxygen atom and so is morpholine, and at least one of the radicals $R^{31}$, $R^{33}$, $R^{35}$ and/or $R^{36}$ must in this case be a radical 2,2,6,6-tetramethylpiperid4-yl, $R^{37}$ is methyl, $R^{38}$ is trimethylene, $n_{5'}$, $n_{5''}$, $n_{5'''}$ are 2 to 4.

Very particular preference is given to mixtures wherein the polymeric HALS compounds B'1 to B'10 in combination with the mixture M are the following substances:

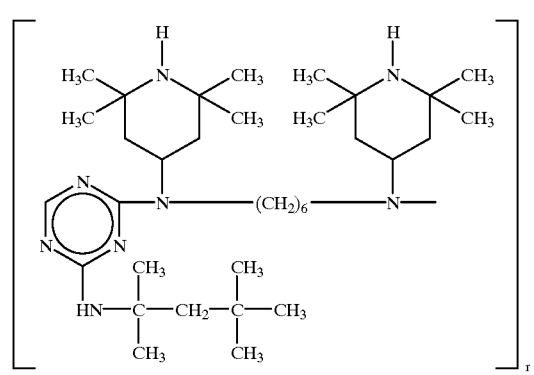

B'1

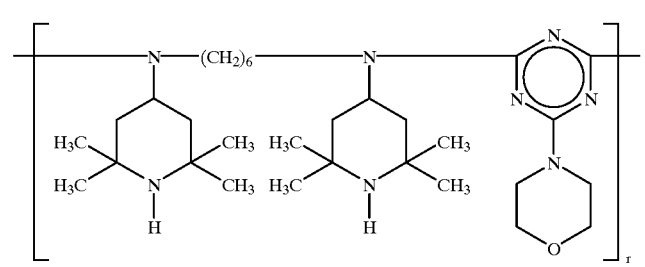

B'2

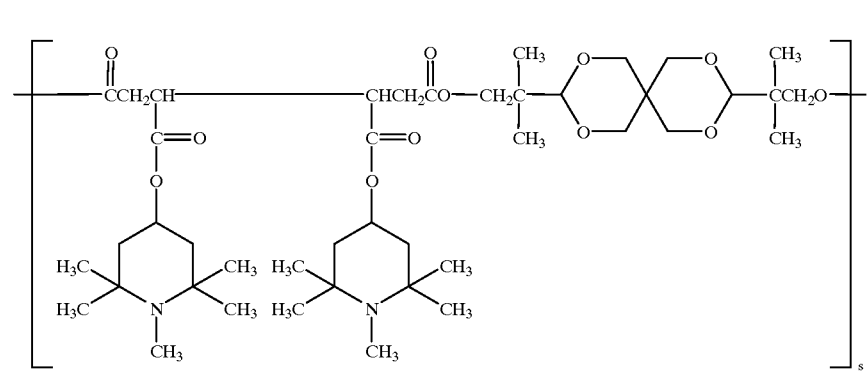

B'3

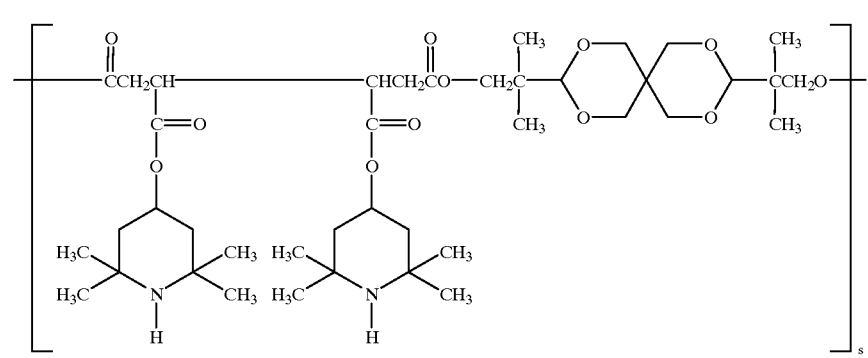

B'4

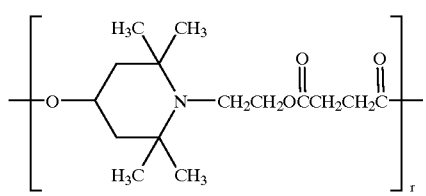
B'5
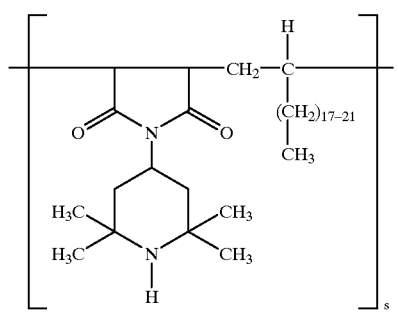
B'6
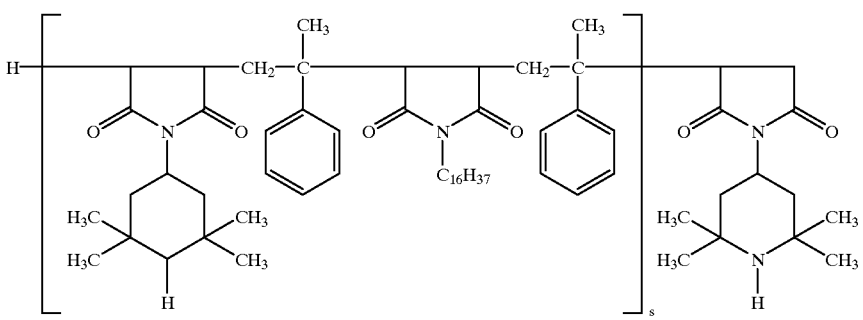
B'7
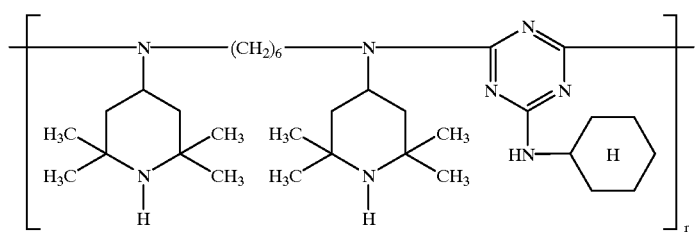
B'8
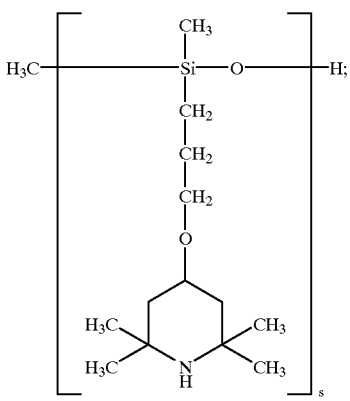
B'9
a product B'10 obtainable by reacting a polyamine of the formula B'10a:
$$H_2N-(CH_2)_3-NH-(CH_2)_2-NH-(CH_2)_3-NH_2 \quad (B'10a)$$
with cyanuric chloride and then reacting the resulting product with a compound of the formula B'10b

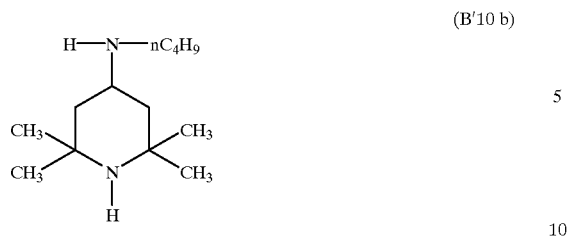
(B'10 b)
where B'10 is a compound of the formula B4-1', B4-2', B4-3'
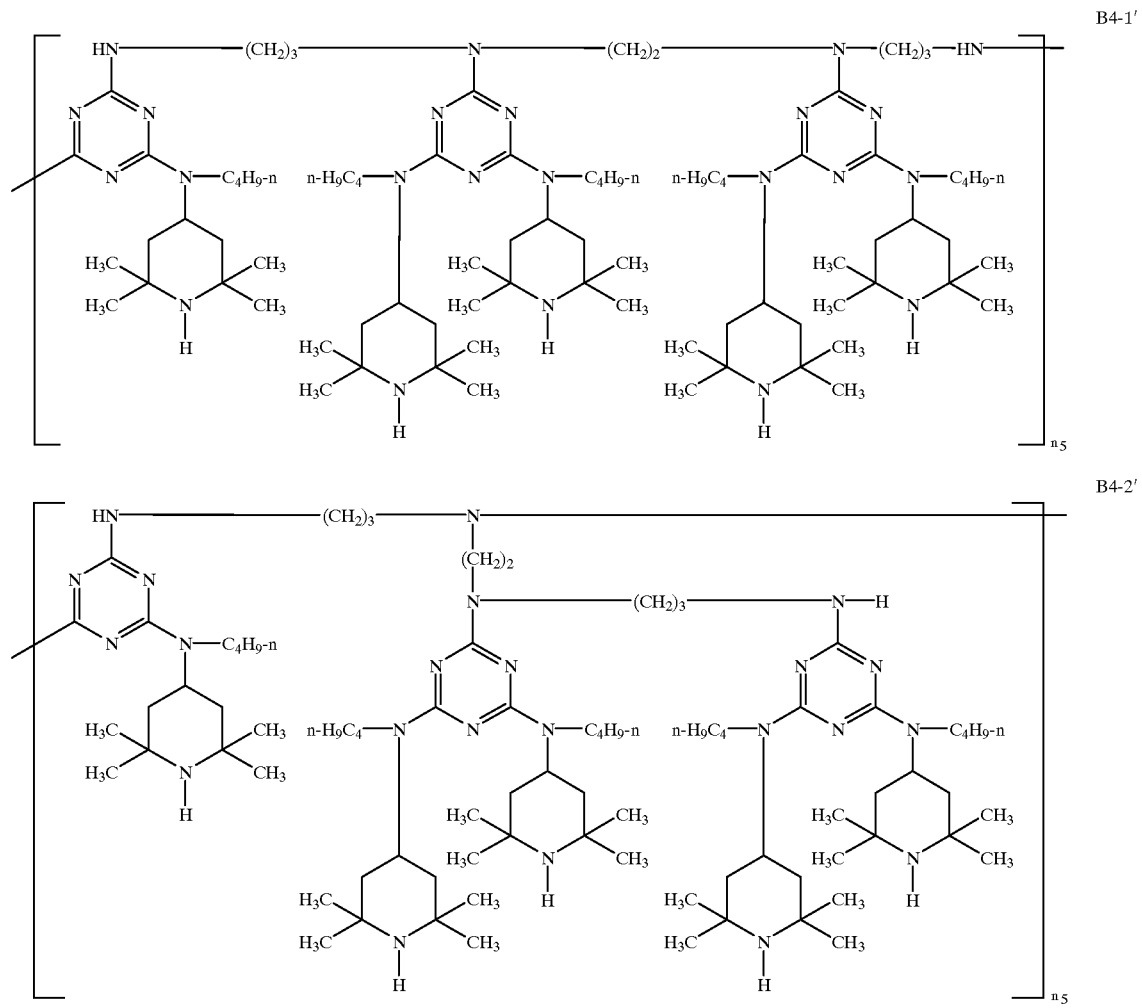

or a mixture thereof, where $n_5$ is 1 to 20.

Of the mixtures described above, particular preference is given to those in which the other co-component(s) is(are) ®Chimassorb 944, ®Tinuvin 622, ®Dastib 1082, ®Uvasorb HA 88, ®Uvinul 5050, ®Lowilite 62, ®Uvasil 299, ®Cyasorb 3346, ®MARK LA 63, ®MARK LA 68 or ®Luchem B 18.

Surprisingly, it was found that the simultaneous use of the mixture M and of the monomeric or polymeric HALS stabilizers described above gives rise to marked synergistic effects.

Also of particular advantage is the combination of the mixture M with phosphites, in the sense that the mixture M suppresses or reduces the hydrolytic breakdown of the phosphite, as in EP-A-400 454, EP-A-592 364, EP-A-143 464, EP-A-576 833, EP-A-558.040, EP-A-278 578, EP-A-676 405, DE-A-4 418 080. The mixture M is particularly suitable for stabilizing phosphites of the formulae C1 to C7:

in which the indices are integral and n' is 2, 3 or 4; u is 1 or 2; t is 2 or 3; y is 1, 2 or 3; and z is 1 to 6; A', if n' is 2, is alkylene of 2 to 18 carbon atoms; —S—, —O— or —NR'$_4$-interrupted alkylene of 2 to 12 carbon atoms; a radical of one of the formulae

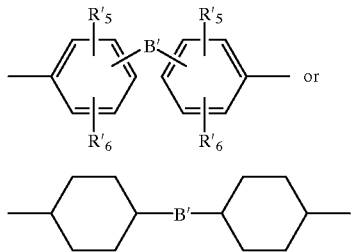

or phenylene;

A', if n' is 3, is a radical of the formula —C$_r$H$_{2r-1}$;

A', if n' is 4, is a radical of the formula

A" is as defined for A' if n' is 2;

B' is a radical of the formula —CH$_2$—; —CHR'$_4$—; —CR'$_1$R'$_4$—; —S— or a direct bond; or a C$_5$–C$_7$-cycloalkylidene; or is cyclohexylidene substituted in position 3, 4 and/or 5 by 1 to 4 C$_1$–C$_4$-alkyl radicals, D', if u is 1, is methyl and, if u is 2, is —CH$_2$OCH$_2$—; E', if y is 1, is alkyl of 1 to 18 carbon atoms, phenyl, a radical of the formula —OR$_1$ or halogen;

E', if y is 2, is a radical of the formula —O—A"—O—;

E', if y is 3, is a radical of the formula

or

Q' is the radical of an at least z-valent alcohol or phenol which is attached to the phosphorus atom(s) via the alcoholic and/or phenolic oxygen atom(s);

R'$_1$, R'$_2$ and R'$_3$ independently of one another are alkyl of 1 to 30 carbon atoms; halogen-, —COOR'$_4$—, —CN— or —CONR'$_4$R'$_4$-substituted alkyl of 1 to 18 carbon atoms; —S—, —O— or —NR'$_4$-interrupted alkyl of 2 to 18 carbon atoms; phenyl–C$_1$–C$_4$-alkyl; cycloalkyl of 5 to 12 carbon atoms; phenyl or naphthyl; phenyl or naphthyl substituted by halogen, 1 to 3 alkyl radicals or alkoxy radicals having in total 1 to 18 carbon atoms or by C$_1$–C$_4$-alkyl; or a radical of the formula

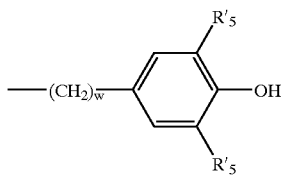

in which w is an integer from the range from 3 to 6;

R'$_4$ or the radicals R'$_4$ independently of one another is or are hydrogen, alkyl of 1 to 18 carbon atoms, cycloalkyl of 5 to 12 carbon atoms, or phenylalkyl of 1 to 4 carbon atoms in the alkyl moiety;

R'$_5$ and R'$_6$ independently of one another are hydrogen, alkyl of 1 to 8 carbon atoms or cycloalkyl of 5 or 6 carbon atoms;

R'$_7$ and R'$_8$, if t=2, independently of one another are C$_1$–C$_4$-alkyl or together are a 2,3-dehydropentamethylene radical; and R'$_7$ and R'$_8$, if t=3, are methyl;

the substituents R'$_{14}$ independently of one another are hydrogen, alkyl of 1 to 9 carbon atoms or cyclohexyl;

the substituents R'$_{15}$ independently of one another are hydrogen or methyl; and R'$_{16}$ is hydrogen or C$_1$–C$_4$-alkyl and, if two or more radicals R'$_{16}$ are present, the radicals R'$_{16}$ are identical or different;

X' and Y' are each a direct bond or —O—; and

Z' is a direct bond; —CH$_2$—; —C(R'$_{16}$)$_2$— or —S—.

Particularly preferred phosphites or phosphonites of the formulae C1, C2, C5 or C6, are those in which n' if the number 2 and y is the number 1 or 2;

A' is alkylene of 2 to 18 carbon atoms; p-phenylene or p-biphenylene;

E', if y=1, is C$_1$–C$_{18}$-alkyl, —OR$_1$ or fluorine; and, if y =2, is p-biphenylene;

R'$_1$, R'$_2$ and R'$_3$ independently of one another are alkyl of 1 to 18 carbon atoms;

phenyl-C$_1$–C$_4$-alkyl; cyclohexyl; phenyl; or phenyl substituted by 1 to 3 alkyl radicals having in total 1 to 18 carbon atoms;

the substituents R'$_{14}$ independently of one another are hydrogen or alkyl of 1 to 9 carbon atoms;

R'$_{15}$ is hydrogen or methyl;

X' is a direct bond;

Y' is —O—; and

Z' is a direct bond or —CH(R'$_{16}$)—.

Very particularly preferred phosphites or phosphonites of one of the formulae C1, C2, C5 or C6 are those in which n' is the number 2 and y is the number 1;

A' is p-biphenylene;

E' is C$_1$–C$_{18}$-alkoxy;

R'$_1$, R'$_2$ and R'$_3$ independently of one another are phenyl substituted by 2 or 3 alkyl radicals having in total 2 to 12 carbon atoms;

the substituents R'$_{14}$ independently of one another are methyl or tert-butyl;

R'$_{15}$ is hydrogen;

X' is a direct bond;

Y' is —O—; and

Z' is a direct bond, —CH$_2$— or —CH(CH$_3$)—.

Special mention should be made of the specific phosphorus compounds of the formulae C'1 to C'12, which can be stabilized effectively by the mixture M:

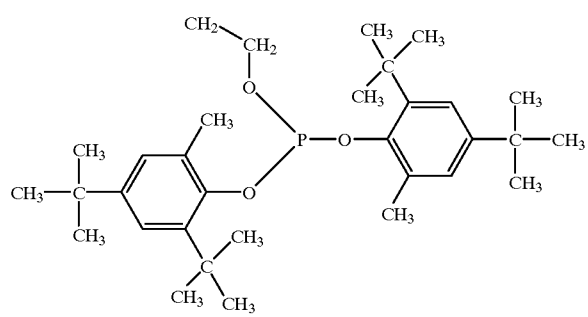
C' 1
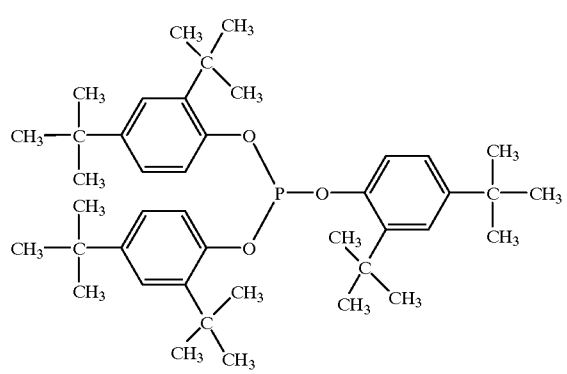
C' 2
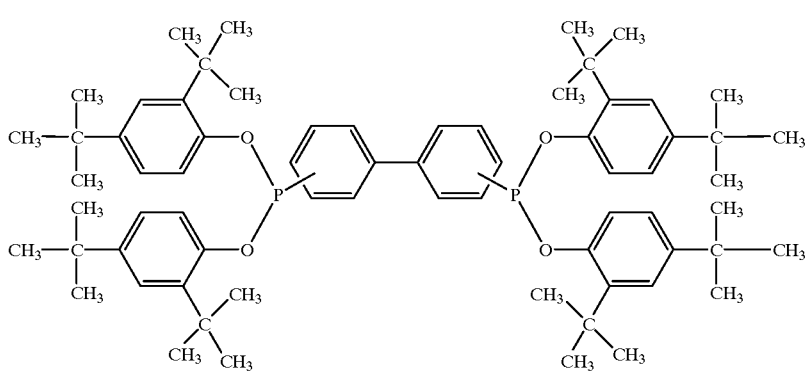
C' 3
In the formula C'3, the two phosphorus substituents are located primarily in positions 4 and 4' of the biphenyl parent structure
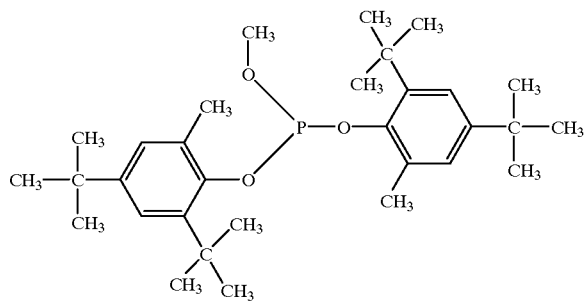
C' 4

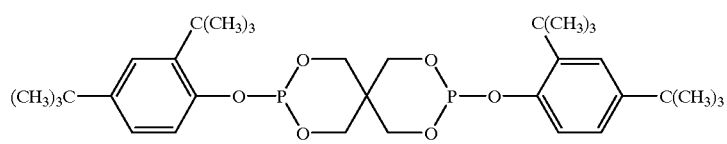
C' 5
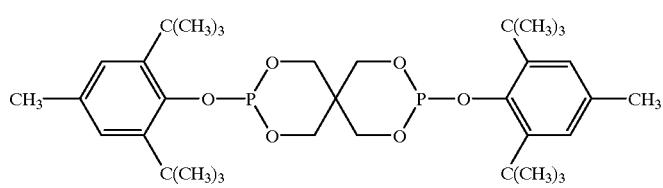
C' 6
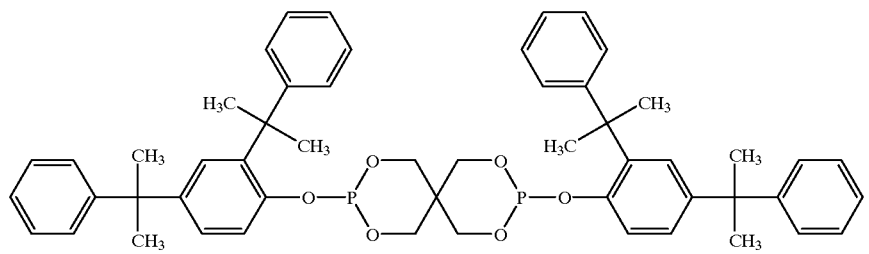
C' 7
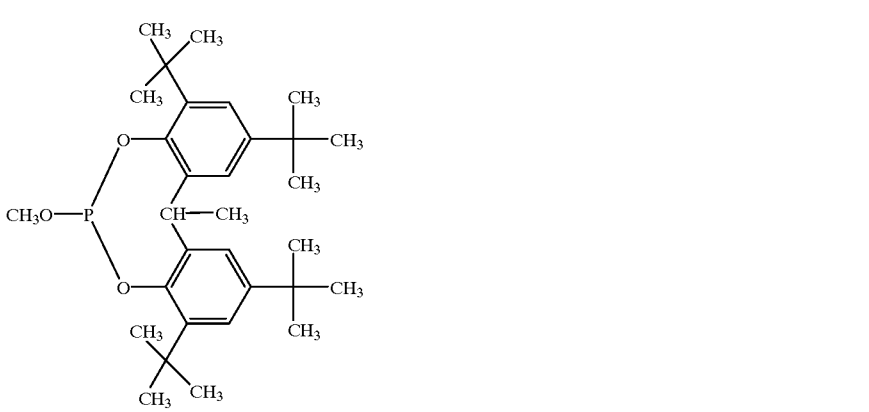
C' 8
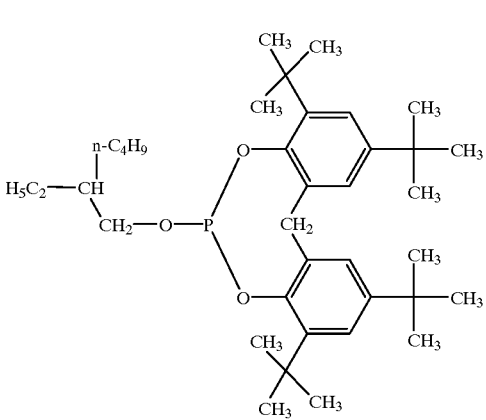
C' 9

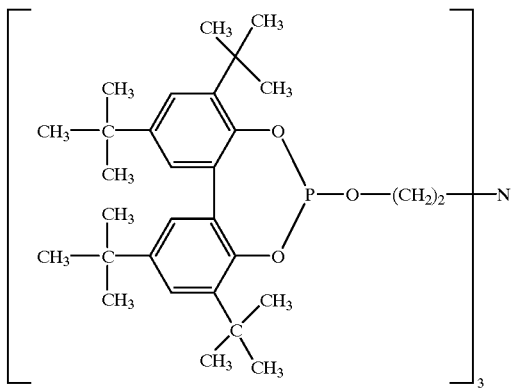

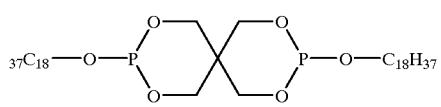

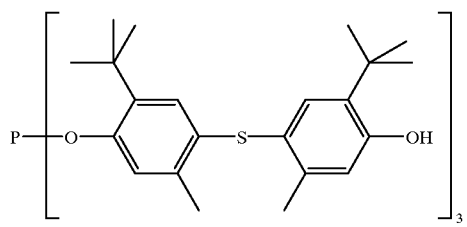

Said phosphites and phosphonites are known compounds and some of them are obtainable commercially.

The following stabilizer mixtures comprise particularly suitable embodiments of the invention:
mixture M and ®Irgafos 38,
mixture M and ®Irgafos 12,
mixture M and ®Hostanox PAR 24,
mixture M and ®Hostanox OSP 1,
mixture M and ®Irgafos P-EPQ,
mixture M and ®Ultranox 626,
mixture M and ®Ultranox 618,
mixture M and ®Mark PEP-36 (from Asahi Denka),
mixture M and ®Mark HP10 (from Asahi Denka),
mixture M and ®Doverphos 9228.

The combination of mixture M with phosphites is also outstandingly suitable in the sense that the phosphite synergistically supports the action of the mixture M in connection with the stabilization of organic material. Synergistic effects of this kind are described in EP-A-359 276 and EP-A-567 117. Mixtures of the mixture M with phosphites of the formulae C'1 to C'12 are particularly suitable.

The mixture M is also outstandingly suitable for combination with phosphite and/or with a sterically hindered phenol and/or with an acid scavenger. A particularly appropriate combination is that of the mixture M in mixtures with phosphite, phenol and acid scavenger in a manner as described in DE-A-19 537 140.

The mixture M and the mixtures described above are also suitable for synergistic combination with other light stabilizers, such as those, for example, from the class of the UV absorbers (2-hydroxybenzophenones or 2-hydroxyphenylbenztriazoles, cinnamic acid derivatives, oxanilides) and/or nickel quenchers.

In the mixtures described above, the proportion of mixture M can be between 1 and 99% by weight.

The mixture M and the mixtures described above can also be combined with one or more N,N-dialkyl-substituted hydroxylamines, preferably with N,N-dioctadecylhydroxylamine.

Furthermore, the mixture M can be combined with one or more basic or other acid-binding costabilizers from the group consisting of the metal carboxylates, oxides, hydroxides and carbonates, and/or zeolites, and/or hydrotalcites.

Preferred costabilizers are calcium stearate, and/or magnesium stearate, and/or magnesium oxide, and/or zinc oxide, and/or carbonate-containing zinc oxide, and/or hydrotalcites.

Particularly preferred costabilizers are ®Zinkoxid aktiv, ®Zinkoxid transparent and/or one of the hydrotalcites ®DHT 4A, ®DHT4 A2, ®Kyowaad 200, ®Kyowaad 300, ®Kyowaad 400, ®Kyowaad 500, ®Kyowaad 600, ®Kyowaad 700, ®Kyowaad 1000, ®Kyowaad 2000.

The mixture M, alone or in appropriate combination with one or more further stabilizers, is highly suitable for stabilizing pigments, as in EP-A-241 419, EP-A-612 792 or EP-A-612 816, or for stabilizing leather, as in EP-A-665 294 and DE-A4 411 369.

Other compounds which lend themselves to advantageous combination with the mixture M or with the above-described mixtures are
synergists of the 3-pyrazolidinone type
synergists of the 3-arylbenzofuran-2-one type
dyes or pigments based on organic or inorganic substances.

Of the 3-arylbenzofuran-2-ones, preference is given to 3-(3,4-dimethylphenyl)-5,7-di-tert-butyl-3H-benzofuran-2-one (formula D)

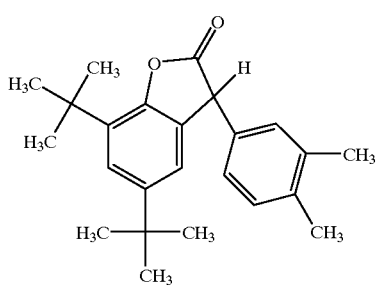

(D)

The mixture M is particularly suitable for applications in organic material, preferably in polymeric material, especially films, fibers and tapes and/or wovens produced therefrom which are in contact with aggressive chemicals, especially with crop protection products. Combinations of this kind are described in EP-A-690 094.

The present invention additionally provides an organic material stabilized against the effect of light, oxygen and heat, examples of such material being precursors of plastics, coating materials, lacquers and oils, and especially plastics, coating materials, lacquers and oils comprising the mixture M in the concentrations indicated above.

Examples of such materials are described in the German Patent Application No. 19 719 944.5 on pp. 44 to 50, the content of which is expressly incorporated herein by reference.

The organic material stabilized by the mixture M or by an appropriate combination comprising this mixture may if desired also comprise further additives, examples being antioxidants, light stabilizers, metal deactivators, antistatic agents, flame retardants, lubricants, nucleating agents, acid scavengers (basic costabilizers), pigments and fillers. Antioxidants and light stabilizers which are added in addition to the mixture M or combinations of the invention are, for example, compounds based on sterically hindered amines or on sterically hindered phenols, or sulfur- or phosphorus-containing costabilizers.

Examples of suitable additives which can additionally be employed in combination are those compounds described in the German Patent Application No. 19 719 944.5 on pages 51 to 65 of the application text, the content of which is expressly incorporated herein by reference.

The mixture M or the combinations described are incorporated into the organic material, preferably into the polymer, by the methods which are general and customary. Incorporation can take place, for example, by mixing or applying the compounds, with or without further additives, into or onto the polymer directly prior to, during or after polymerization, or into the polymer melt prior to or in the course of shaping. Incorporation can also take place by applying the dissolved or dispersed compounds to the polymer directly or by mixing them into a solution, suspension or emulsion of the polymer, with or without subsequent evaporation of the solvent. The compounds are also effective if they are introduced subsequently, in a separate processing step, into a ready-granulated polymer. The mixture M of the invention can also be added to the polymers to be stabilized in the form of a masterbatch which comprises these compounds, for example, in a concentration of from 1 to 75, preferably from 2.5 to 30% by weight.

EXAMPLE 1

Preparing the Oligomer 1

31.2 g (0.20 mol) of 20,20'-(2-hydroxy-1,3-propanediyl)bis[2,2,4,4-tetramethyl-7-oxa-3,20-diazadispiro[5.1.11.2]heneicosan-21-one] (compound II') and 168.0 g (0.40 mol) of 2,2,4,4-tetramethyl-20-(oxiranylmethyl)-7-oxa-3,20-diazadispiro[5.1.11.2]heneicosan-21-one are polymerized in vacuo at 200° C. for 6 h.

In the course of this operation the solid substances melt to give a colorless, viscous melt. Following the cooling of the reaction material, the brittle mixture is forced from the flask with liquid nitrogen and is ground in a laboratory mill. The melting range of the oligomer is from 164 to 214° C.; the molar weight as determined by osmometry is 1640 g/mol; GPC analysis gave an $M_n$ of 1353 g/mol and an $M_w$ of 1857 g/mol.

EXAMPLES 2 TO 3

Preparation of the Mixture M1, M2 x g (cf. Table 1) of the oligomer obtained in Example 1 are dissolved together with y g of 20,20'-(2-hydroxy-1,3-propanediyl)bis[2,2,4,4-tetramethyl-7-oxa-3,20-diazadispiro[5.1.11.2]heneicosan-21-one] and z g of 20-(2,3-dihydroxypropyl)-2,2,4,4-tetramethyl-7-oxa-3,20-diazadispiro[5.1.11.2]heneicosan-21-one in 500 ml of o-xylene and the solution is stirred thoroughly. The solvent is removed in vacuo at 100° C.; the brittle residue which remains is ground in a laboratory mill.

TABLE 1

| Preparation of the mixtures of the invention | | |
|---|---|---|
| | Example 2: Mixture M1 | Example 3: Mixture M2 |
| x | 85 | 85 |
| y | 10 | 15 |
| z | 5 | 0 |

EXAMPLES 4 TO 7

Synergy of Mixture M1, M2

100 parts by weight of unstabilized polypropylene (®Hostalen PPK) were kneaded together with 0.2 part by weight of calcium stearate, 0.1 part by weight of tris(2,4-di-tert-butylphenyl) phosphite (®Hostanox PAR 24) and 0.2 part by weight of the test stabilizer, or the mixture M1/M2, in a Brabender mixer at 200° C. and 20 rpm for 10 minutes. A 200 μm thick film was pressed from this mixture at 200° C., and the test specimens obtained in this way were exposed in an accelerated weathering device (®Xenotest 1200). The criterion used for the stability of the film was the change in the carbonyl index within this period of time. The carbonyl index CO here was determined in accordance with the formula $CO = E_{1720}/E_{2020}$ (E=extinction (absorbance)). For purposes of comparison, a film was tested under the same conditions but without the addition of a stabilizer of the invention. The experimental results are collated in Table 2:

TABLE 2

(Example Experiments 4 to 7): Time taken for the carbonyl index to increase by 1.0 unit.

|  | Example 4: Oligomer 1* | Ex. 5: Dimer** | Example 6: Mixture 1*** | Ex. 7: Mixture 2**** | Comparative experiment |
|---|---|---|---|---|---|
| Stabilizer content in the PP (in % by wt.) | 0.2 | 0.2 | 0.2 | 0.2 | None |
| Expected time in h (ΔCO > 1.0) | — | — | Between 930 and 950 h | Between 930 and 950 h | — |
| Actual time found in h (ΔCO > 1,0) | 950 h | 930 h | 1210 h | 1060 h | 410 h |

*from Example 1
**20,20'-(2-hydroxy-1,3-propanediyl)bis[2,2,4,4-tetramethyl-7-oxa-3,20-diazadispiro[5.1.11.2]heneicosan-21-one]
***from Example 2
****from Example 3

EXAMPLES 8 TO 10

Synergism of Mixture M1 with Monomeric HALS Stabilizers 100 parts of PE-LD (®Hostalen PPT 0170) are mixed with 0.6 part of HALS stabilizer and the mixture is granulated twice. The granules are processed to injection-molded sheets with a thickness of 3.5 mm. The test specimens prepared in this way were subjected to outdoor weathering in Florida, the test specimens being fixed at an inclination of 45° facing south. As the criterion for the damage suffered, the surface embrittlement (SEMB) of the test specimens was assessed visually at regular intervals using a microscope at 100× magnification. The degree of embrittlement is assessed with ratings from a scale from 1 to 6. On this scale, 6 denotes very severe SEMB. On reaching this rating, the experiment was terminated and the time was recorded.

TABLE 3

Time until severe surface embrittlement (rating of 6) is reached.

| Stabilizer | Example 8 | Example 9 | Example 10 |
|---|---|---|---|
| Mixture M1 | 0.6 | 0 | 0.2 |
| Monomer HALS* | 0 | 0.6 | 0.4 |
| Expected time** | — | — | 1140 d |
| Actual time found | 900 d | 1260 d | 1260 d |

*2,2,4,4-Tetramethyl-7-oxa-3,20-diazadispiro[5.1.11.2]heneicosan-21-one (Hostavin N 20)

EXAMPLES 11 TO 13

Synergism of Mixture M1 with a Polymeric HALS Stabilizer

A mixture of M1 with the polymer of N-hydroxyethyl-4-hydroxy-2,2,6,6-tetramethyl-1-piperidine and sebacic acid (®Tinuvin 622) was prepared by melting the substances in vacuo on a rotary evaporator and thoroughly homogenizing them. After the reaction mixture had cooled, the viscous resin was forced from the flask with liquid nitrogen and pulverized in a laboratory mill.

TABLE 4

(Example mixtures 11 to 13): Mixtures for the experiments for demonstrating the synergy of mixture M 1 with a polymeric HALS stabilizer

| Stabilizer | Example 11 | Example 12 | Example 13 |
|---|---|---|---|
| Mixture M1 | 100% | 0% | 60% |
| HALS 1* | 0% | 100% | 40% |

*Polymer of N-hydroxyethyl-4-hydroxy-2,2,6,6-tetramethyl-1-piperidine and sebacic acid (® Tinuvin 622)

The mixtures of Examples 11–13 are used to prepare, with the carrier material ®Hostalen PPU 1780 F 2 (polypropylene with basic stabilization), a 15% masterbatch which was granulated with a counter-rotating twin-screw extruder from Leistritz. 99 parts by weight of polypropylene (Hostalen PPU 1780 F 2) are admixed in each case with one part by weight of one mixture from Examples 11–13, the components are mixed thoroughly (the end concentration of the stabilizer in the polymer is then 0.15% by weight) and the mixture is spun into multifilaments on a spinning unit (Blaschke extruder, diameter 30 mm, 25 D, spinneret 263–265° C., 26-hole spinneret with an individual bore diameter of 250 μm, spinning rate 450 m/min, spinning titer 1100 dtex and drawn to about 20% residual extension). A multifilament thus drawn has a draw titer of 420f26 dtex (corresponding to a filament titer of about 16 dtex). The multifilament was wound up onto small test plates measuring 11×4×0.4 cm and exposed in an accelerated weathering device (®Xenotest 1200) in accordance with DIN 53387, without irrigation. At regular intervals, the decrease in the tear strength as a measure of the loss of mechanical properties of the fiber was recorded.

TABLE 5

Testing the relative tear strength on PP multifilament: Before exposure the relative tear strength of the multifilaments is measured; after exposure in the ® Xenotest 1200 the measured tear strength is compared with the blank value. The table indicates the number of hours after which the tear strength has decreased by half (50% value). Each multifilament is stabilized with 0.15% of light stabilizer.

|  | Multifilament, stabilized with light stabilizer from Example 11 | Multifilament, stabilized with light stabilizer from Example 12 | Multifilament, stabilized with light stabilizer from Example 13 |
|---|---|---|---|
| 50% value (in hours) | 3300 h | 2900 h | 5000 h |

Result:

Polymer of N-hydroxyethyl-4-hydroxy-2,2,6,6-tetramethyl-1-piperidine and sebacic acid (®Tinuvin 622): effective as light stabilizer Mixture M1: effective as light stabilizer Mixture of ®Tinuvin 622 and mixture M1: more effective than the sum of the individual effects

EXAMPLE 14

Protecting Phosphite Against Hydrolytic Decomposition 125 g of the phosphite ®Weston 626 (Table 6) are thoroughly dry-mixed with 5 g of the mixture M2. The powder mixture prepared in this way, and a second sample containing ®Weston 626 alone, are stored in a climatically controlled chamber (23° C./50% relative atmospheric humidity). The increase in weight is recorded at regular intervals of time. Said increase in weight is a measure of the amount of water absorbed, from which it is possible to derive the progressive hydrolysis of the phosphite. After 24 days the weight of the pure ®Weston 626 increased by 3.0 g; the weight of the mixture comprising M2, however, increases only by 2.0 g. This shows that the mixture M2 greatly reduces the rate of hydrolysis of phosphites.

EXAMPLES 15 TO 18

Synergism of Mixture M1+UV Absorber 100 parts by weight of thermoplastic polyurethane (®Desmopan 358, Bayer AG) are dried in a polymer dryer at 110° C. for 2 h. Then 0.50 part by weight of a light stabilizer or of a stabilizer mixture are drummed in hot. The granules thus prepared are processed into sheets (thickness: 1 mm) in an injection molding machine (cylinder temperature 200–210–220–230° C., injection pressure: 1000 bar, back pressure 0 bar, 500 bar). These small sheets are exposed in an accelerated weathering device (®Xenotest 1200, filter Suprax d=1.7; black standard temperature 45+/− 5° C.; cycle 18/102 in accordance with DIN 53387). The measure of damage incurred was the increase in yellowing (Yellowness Index).

TABLE 7

Damage caused to thermoplastic polyurethane by UV light; the figure stated is in each case the Yellowness Index (YI) after 500 h of exposure. A high YI denotes a high degree of damage.

|  | Example 15 | Example 16 | Example 17 | Example 18 |
|---|---|---|---|---|
| Mixture M 1 | — | 0.50 | — | 0.25 |
| Absorber 1* | — | — | 0.50 | 0.25 |
| Expected YI** | — | — | — | 39 |
| Actual YI found | 52 | 43 | 34 | 33 |

*2-Hydroxy-4-n-octloxybenzophenone (® Hostavin ARO 8)

EXAMPLES 19 TO 21

Resistance of Mixture M1 to Aggressive Chemicals 100 parts by weight of unstabilized polyethylene (®LE 4510, Borealis) were dry-mixed together with 0.03 part by weight of stearyl 3-(4-hydroxy-3,5-di-tert-butylphenyl) propionate (®Hostanox O 16) and 0.3 part by weight of a stabilizer (cf. Table 8) and the mixture was granulated with a Leistritz extruder. A 200 µm thick film was pressed from these granules, and the film obtained in this way was exposed in an accelerated weathering device (®Xenotest 150 or ®Xenotest 450, cf. Tables 8 and 9). After 100 h of exposure, the film is immersed in each case for 16 h in a 0.1 N solution of sulfurous acid or nitrous acid, and then exposure is continued. The criterion employed for the stability of the film was the carbonyl index. The carbonyl index CO was determined here in accordance with the formula CO=$E_{1720}/E_{2020}$ (E=extinction (absorbance)). For purposes of comparison, a film was tested under the same conditions but without the addition of the stabilizer mixture of the invention. The experimental results are collated in Tables 8 and 9:

TABLE 8

Effect of $H_2O/SO_2$ (a 0.1 N $H_2SO_3$ solution was used) on the UV stability of PE-LD films (Xenotest 150, filter 6 IR + 1 UV); the parameter stated is in each case the time until the carbonyl index rises by 1.5 units. A high value therefore denotes slow destruction of the film and hence good stabilization.

|  | Example 19 | Example 20 | Example 21 |
|---|---|---|---|
| 0.3% stabilizer | HALS 1* | HALS 2** | Mixture M 1 |
| Time until ΔCO of 1.5 is reached | 611 h (3390 h*) | 875 h (>4100 h***) | 1383 h (>4100 h***) |

*Polymer of N-hydroxyethyl-4-hydroxy-2,2,6,6-tetramethyl-1-piperidine and sebacic acid (® Tinuvin 622)
**Reaction product of the polymer of N,N'-bis(2,2,6,6-tetramethyl-4-piperidinyl)-1,6-hexanediamine and 2,4,6-trichloro-1,3,5-triazine with 2,4,4-trimethyl-2-pentanamine (® Chimassorb 944)
***The value in brackets is that reached without chemical treatment

TABLE 9

Effect of $HNO_2$ (a 0.1 N $HNO_2$ solution was used) on the UV stability of PE films (Xenotest 450, filter 6 IR + 1 UV); the parameter stated is in each case the time until the carbonyl index rises by 0.3 units. A high value therefore denotes slow destruction of the film and hence good stabilization.

|  | Example 22 | Example 23 | Example 24 |
|---|---|---|---|
| 0.3% stabilizer | HALS 1* | HALS 2** | Mixture M 1 |
| Time until ΔCO of 1.5 is reached | 958 h (3390 h***) | 1500 h (>4100 h***) | 2180 h (>4100 h***) |

*Polymer of N-hydroxyethyl-4-hydroxy-2,2,6,6-tetramethyl-1-piperidine and sebacic acid (® Tinuvin 622)
**Reaction product of the polymer of N,N'-bis(2,2,6,6-tetramethyl-4-piperidinyl)-1,6-hexanediamine and 2,4,6-trichloro-1,3,5-triazine with 2,4,4-trimethyl-2-pentanamine (® Chimassorb 944)
***The value in brackets is that reached without chemical treatment Tables 8 and 9 underline the fact that the mixture M1 provides better stabilization of a PE film following chemical treatment than the stabilizers employed by way of comparison, ®Tinuvin 622 and ®Chimassorb 944.

EXAMPLES 25 TO 28

Combination of Mixture M1 With Acid Scavengers; Chemical Resistance 100 parts by weight of unstabilized PE-LD (®LE 4510, Borealis) were dry-mixed together with 0.03 part by weight of stearyl 3-(4-hydroxy-3,5-di-tert-butylphenyl)propionate (®Hostanox O 16), 0.06 part by weight of (®Hostanox PAR 24), 0.4 part by weight of the mixture M1, with or without the addition of acid-binding chemicals and this initial mixture was granulated using a Leistritz twin-screw extruder. The granules prepared in this way were processed in each case to form a blown film from which elongated film strips were punched in accordance with DIN 53455. The film strips obtained in this way were exposed in an accelerated weathering device (®Xenotest 1200 without irrigation cycle). After an exposure period of 144 h in each case, the film strips were subjected over a period of 60 minutes to treatment with 5% strength aqueous endosulfan solution, and then exposure was continued. The criterion used for the stability of the film was the change in relative elongation at break within this period of time. The relative elongation prior to the beginning of the experiment up until the film strip tore was taken as the 100% value. Table 10 indicates in each case the exposure period after which the relative elongation at break has fallen to 50% of the original value. For purposes of comparison, a film was tested under the same conditions but without the addition of the stabilizer mixture of the invention. The experimental results are collated in Table 10.

TABLE 10

Improvement in the photoprotective effect of PE-LD which has been stabilized with mixture M 1 by adding acid-binding compounds.

| Stabilizer | 25 | 26 | 27 | 28 |
|---|---|---|---|---|
| Mixture M 1 | 0.4% | 0.4% | 0.4% | 0.4% |
| DHT-4a* | 0% | 0.2% | 0% | 0% |
| DHT-4a-2* | 0% | 0% | 0.2% | 0% |
| ZnO** | 0% | 0% | 0% | 0.05% |
| Ca stearate*** | 0% | 0% | 0% | 0.05% |
| Time | 800 h | 1040 h | 1040 h | 840 h |

*Kyowa
**Aldrich
***Greven

Table 10 documents the fact that the light stabilizing action of the mixture M1 on contact with an aggressive chemical (endosulfan) is increased further by the additional use of acid-binding compounds.

What is claimed is:

1. A mixture M comprising the compound I in a proportion of 65–95% by weight, the compound II in a proportion of 5–35% by weight and the compound III in a proportion of 0–10% by weight, wherein the percentages by weight are based on the overall weight of the mixture

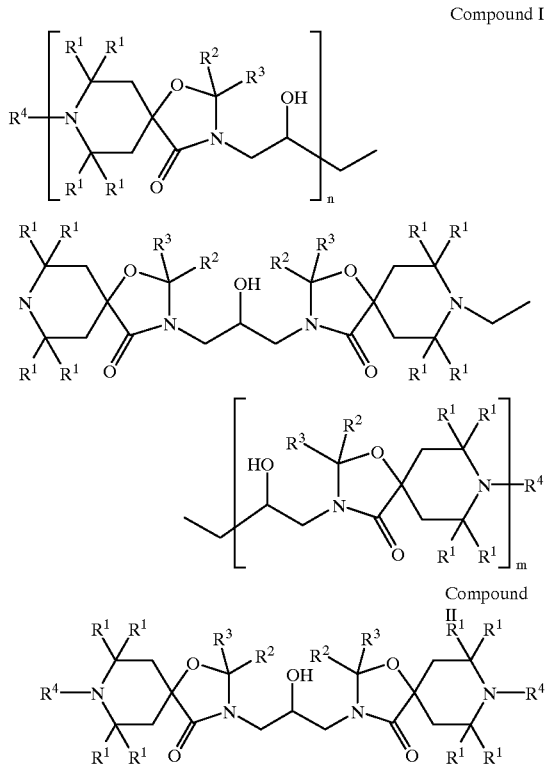

Compound I

Compound II

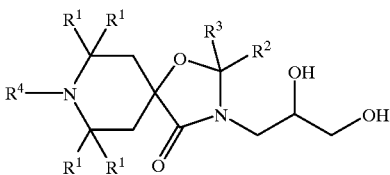

Compound III in which n and m independently of one another are a number from 0 to 100, but n and m cannot both be 0, $R^1$ is hydrogen, $C_5$–$C_7$-cycloalkyl, or a $C_1$–$C_{12}$-alkyl group, $R^2$ and $R^3$ independently of one another are a hydrogen atom or a $C_1$–$C_{18}$-alkyl group or, together with the carbon atom connecting them, are a 5- to 13-membered ring or, together with the carbon atom connecting them, are a group of the formula (IV) where $R^1$ is defined as above

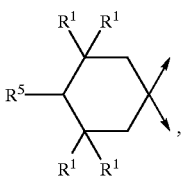

(IV)

$R^4$ and $R^5$ independently of one another are either hydrogen or a $C_1$–$C_{22}$-alkyl group, an oxygen radical O*, —OH, —NO, —CH$_2$CN, benzyl, allyl, a $C_1$–$C_{30}$-alkyloxy group, a $C_5$–$C_{12}$-cycloalkyloxy group, a $C_6$–$C_{10}$-aryloxy group, a $C_7$–$C_{20}$-arylalkyloxy group, a $C_3$–$C_{10}$-alkenyl group, a $C_3$–$C_6$-alkynyl group, a $C_1$–$C_{10}$-acyl group, halogen or unsubstituted or $C_1$–$C_4$-alkyl-substituted phenyl.

2. The mixture as claimed in claim 1, wherein the compound I is in a proportion of from 75% to 94% by weight, the compound II is in a proportion of from 5 to 20% by weight and the compound III is in a proportion of from 1 to 5% by weight, wherein the percentages by weight are based on the overall weight of the mixture.

3. The mixture as claimed in claim 1, wherein the compound I is in a proportion of from 85% to 94% by weight, the compound II is in a proportion of from 5 to 12% by weight and the compound III is in a proportion of from 1 to 3% by weight wherein the percentages by weight are based on the overall weight of the mixture.

4. The mixture as claimed in claim 1, wherein n and m independently of one another are a number from 0 to 10, but n and m cannot both be 0, $R^1$ is hydrogen, $C_6$-cycloalkyl, or a $C_1$–$C_4$-alkyl group, $R^2$ and $R^3$ independently of one another are a hydrogen atom or a $C_1$–$C_8$-alkyl group or, together with the carbon atom connecting them, are a 6-to 12-membered ring or, together with the carbon atom connecting them, are a group with formula (IV), $R^4$ and $R^5$ independently of one another are either hydrogen or a $C_1$–$C_5$-alkyl group, an oxygen radical O*, —OH, —NO, —CH$_2$CN, benzyl, allyl, a $C_1$–$C_{10}$-alkyloxy group, a $C_5$–$C_6$-cycloalkyloxy group, a $C_6$–$C_7$-aryloxy group, a $C_7$–$C_{10}$-arylalkyloxy group, a